March 29, 1938. R. L. CARR 2,112,330
VEHICLE BODY
Filed June 1, 1933 8 Sheets-Sheet 1
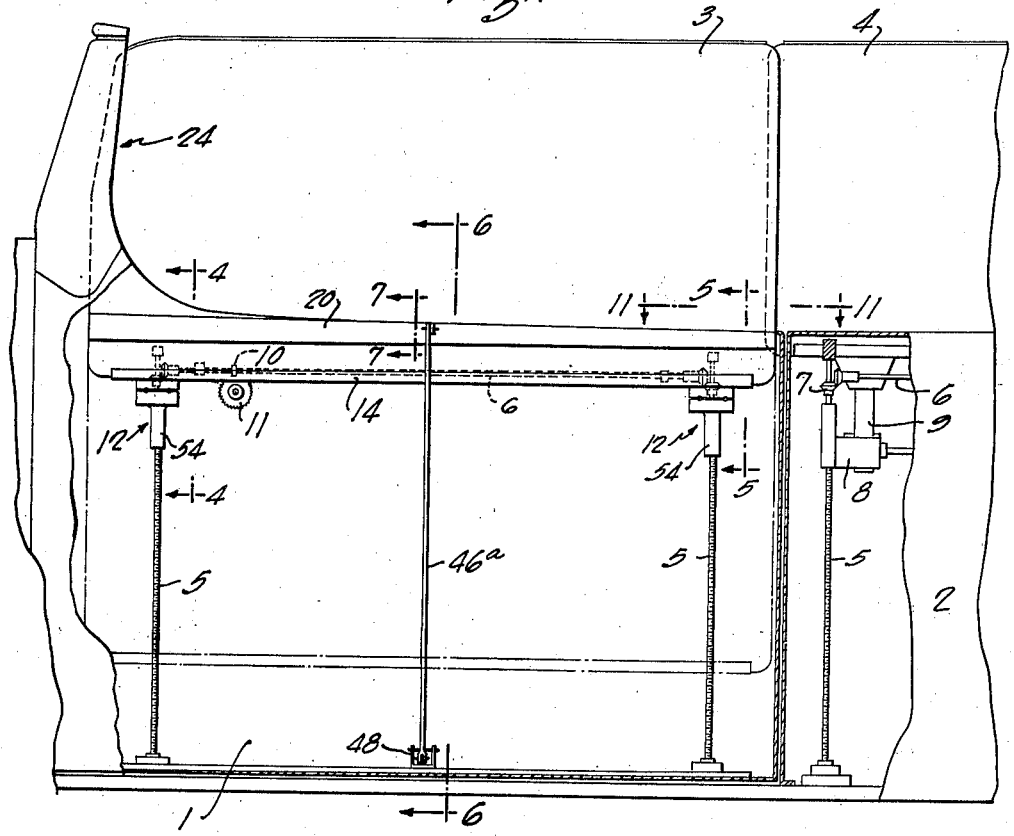
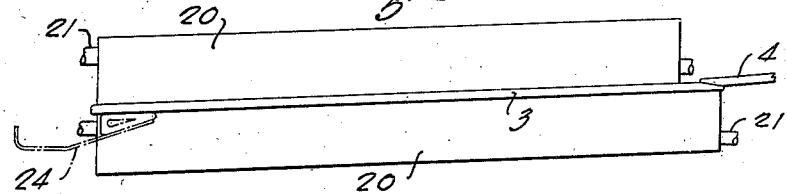
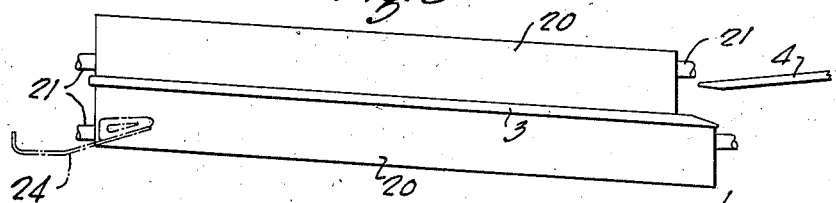
Inventor
Raymond L. Carr March 29, 1938.  R. L. CARR  2,112,330
VEHICLE BODY
Filed June 1, 1933   8 Sheets-Sheet 2
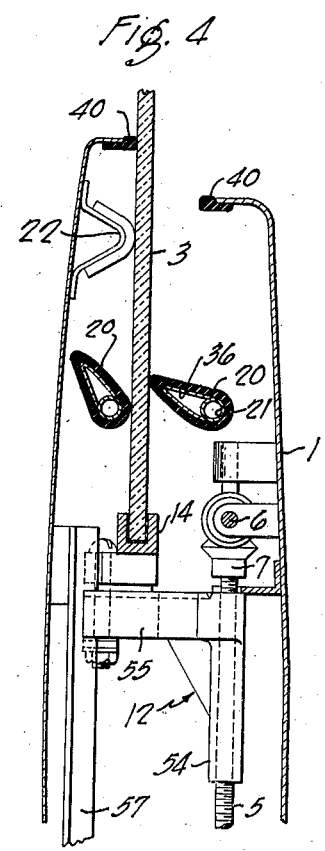
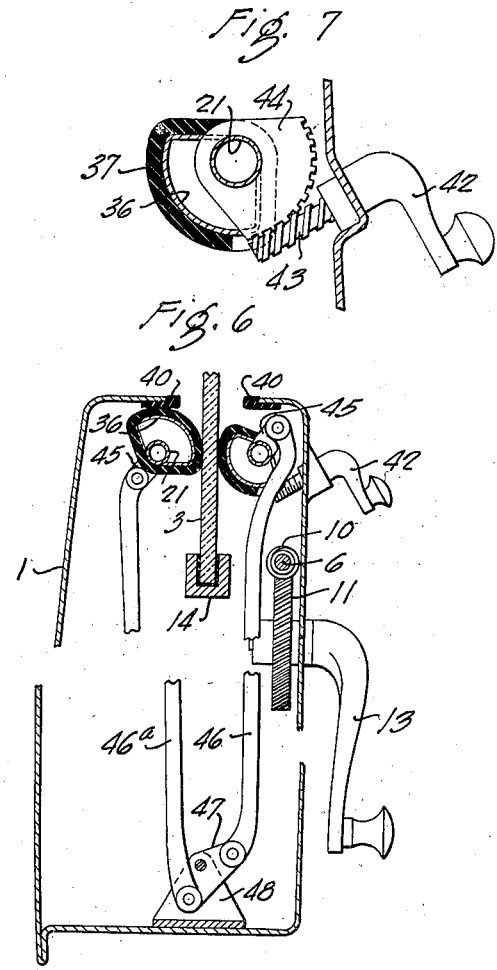
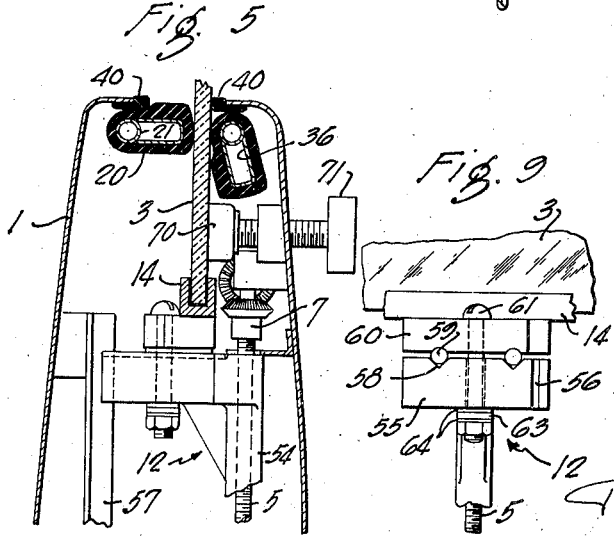
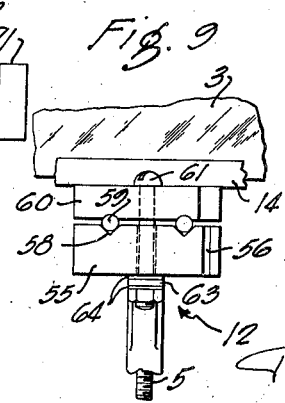
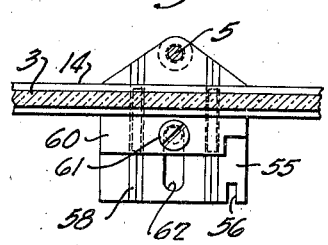
Inventor
Raymond L. Carr

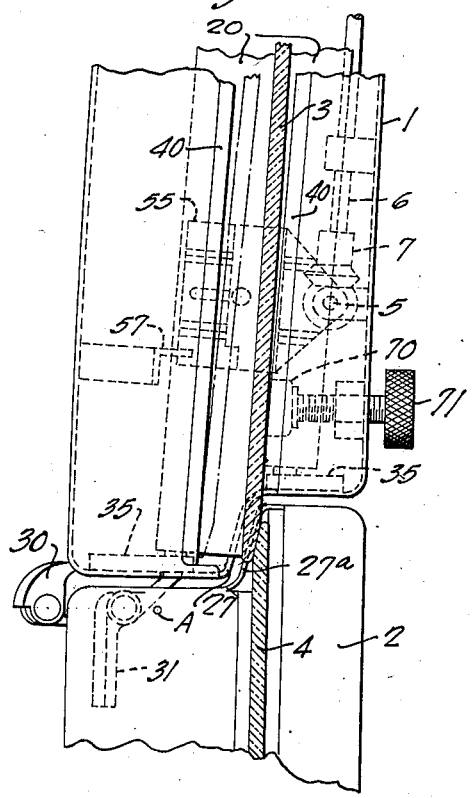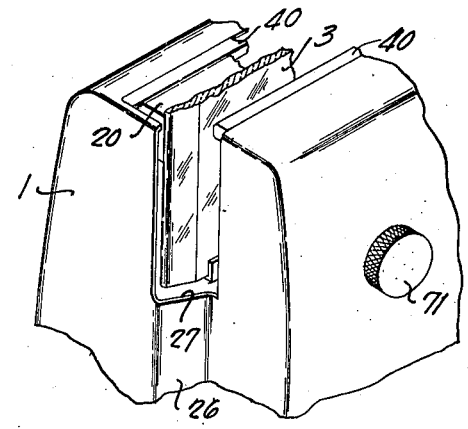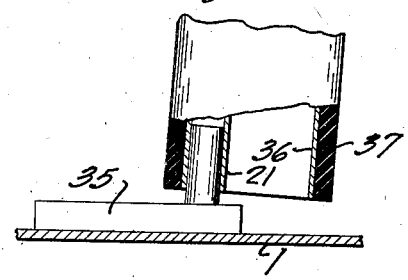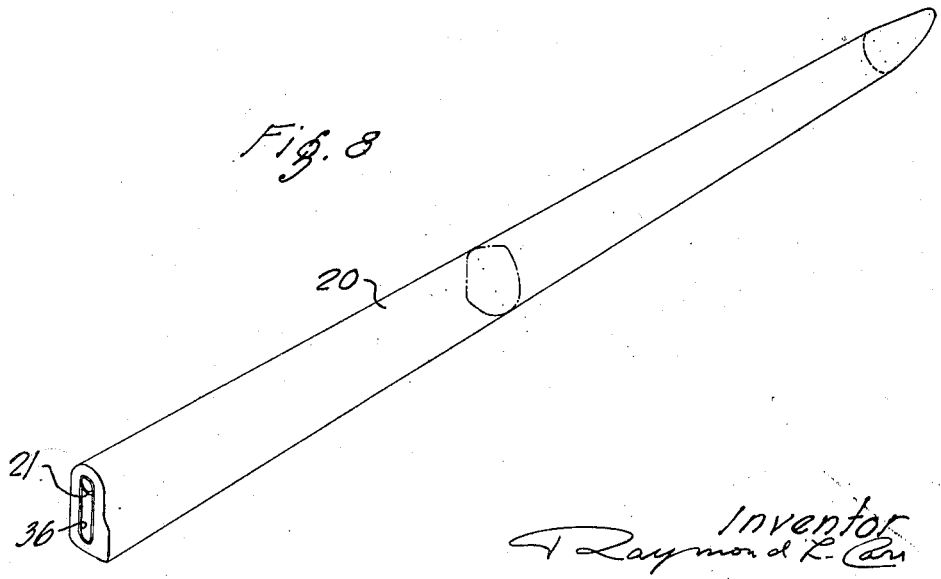

March 29, 1938.  R. L. CARR  2,112,330
VEHICLE BODY
Filed June 1, 1933  8 Sheets-Sheet 4
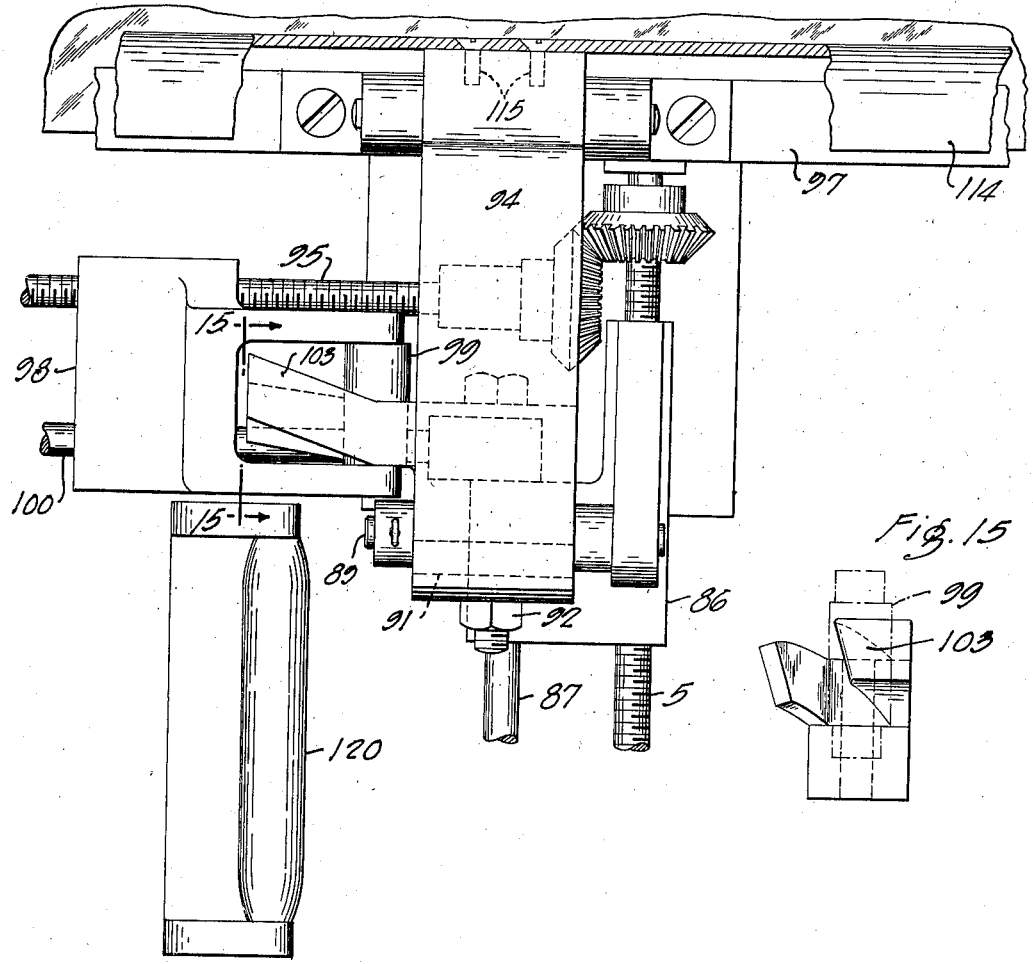

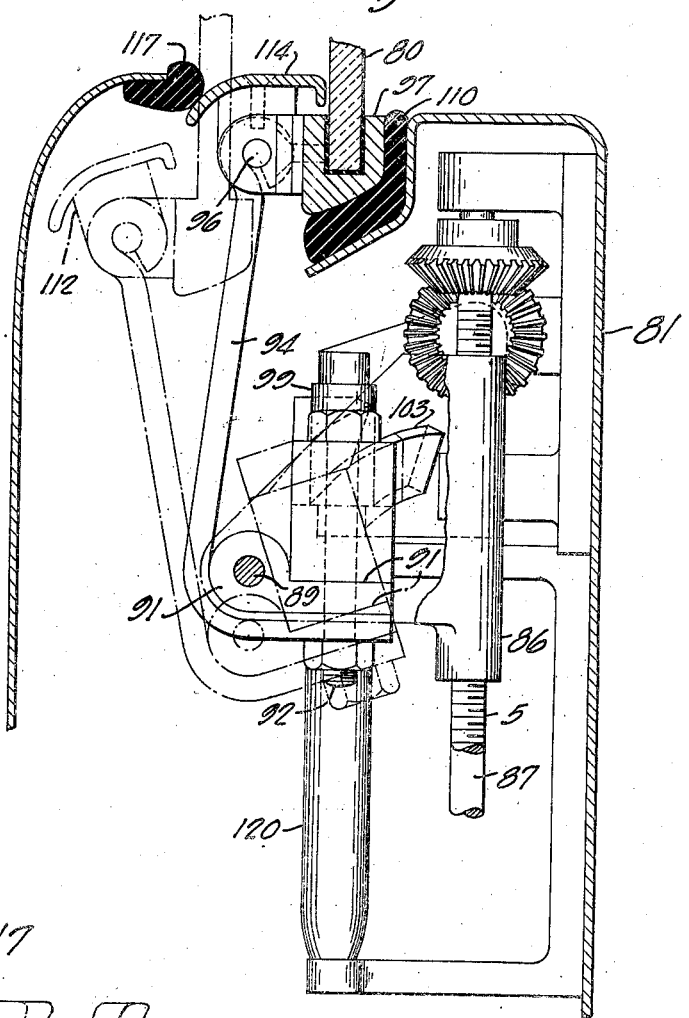
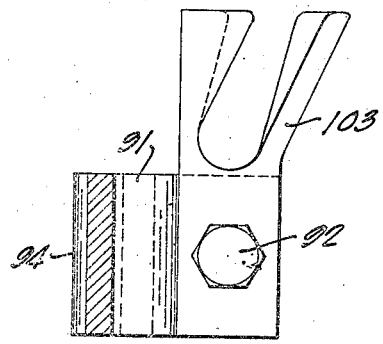

March 29, 1938. R. L. CARR 2,112,330
VEHICLE BODY
Filed June 1, 1933 8 Sheets-Sheet 7
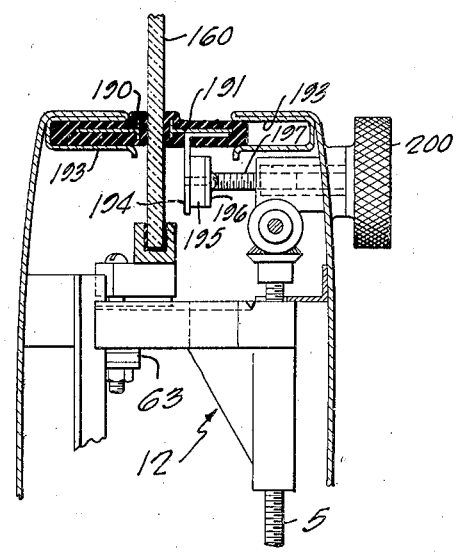
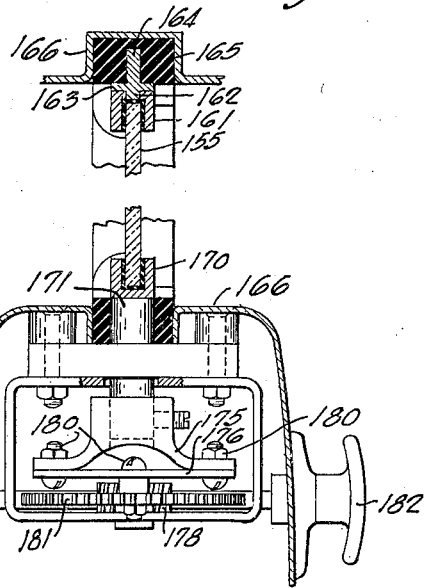
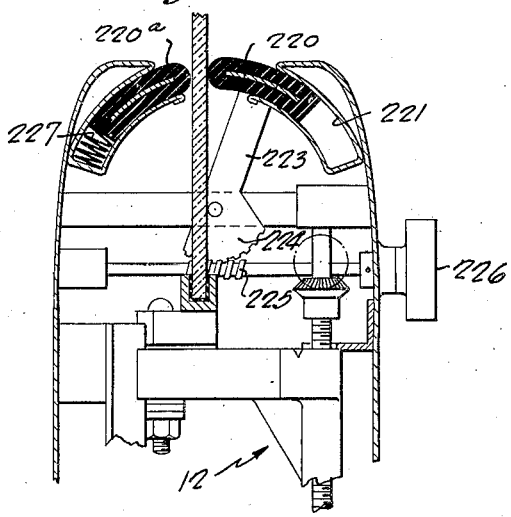
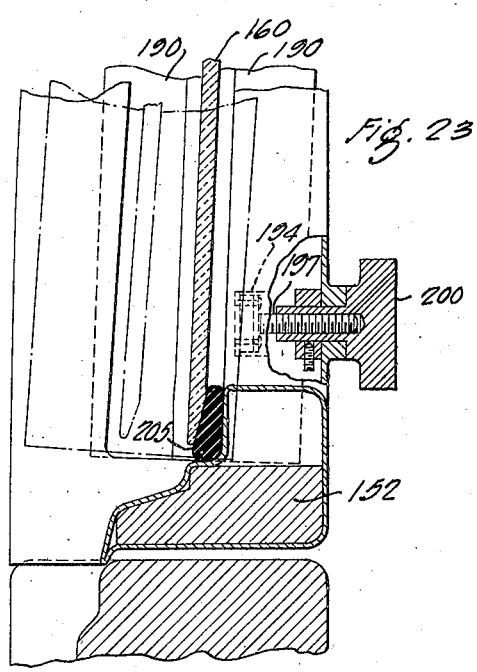
Inventor
Raymond L. Carr March 29, 1938. R. L. CARR 2,112,330
VEHICLE BODY
Filed June 1, 1933 8 Sheets-Sheet 8
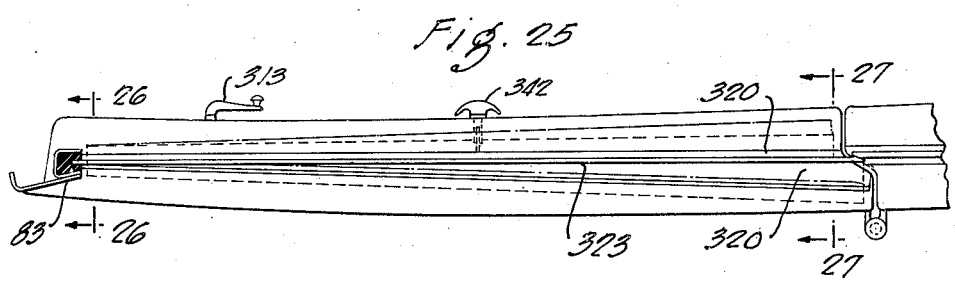
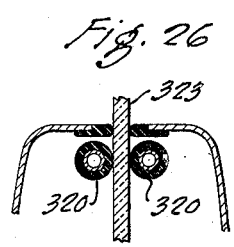 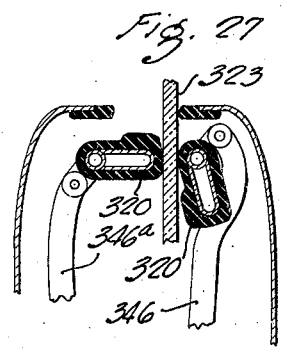
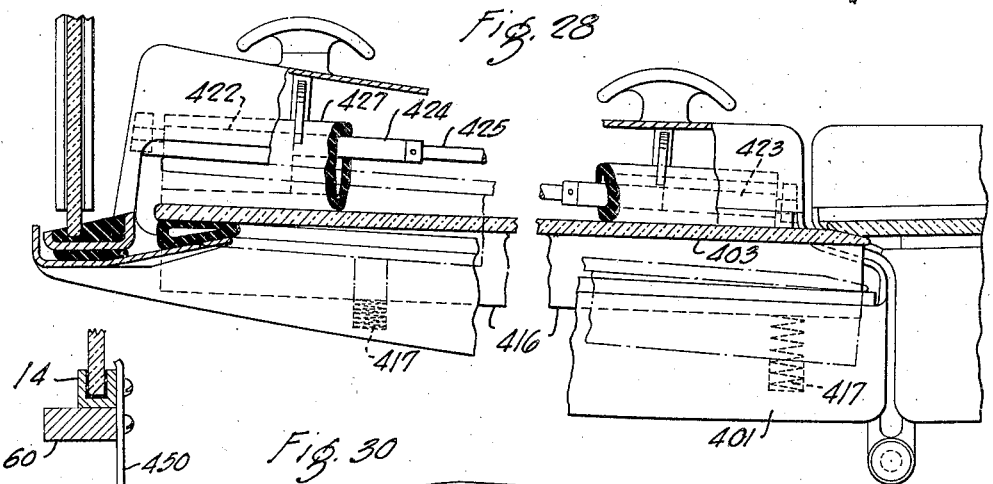
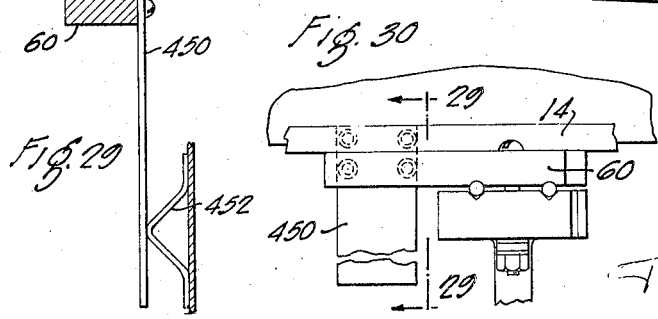
Inventor
Raymond L. Carr Patented Mar. 29, 1938

2,112,330

UNITED STATES PATENT OFFICE 2,112,330

VEHICLE BODY

Raymond L. Carr, Boston, Mass.

Application June 1, 1933, Serial No. 673,859

12 Claims. (Cl. 296—44)

This invention relates to improved vehicle body arrangements, and particularly to closure arrangements and manipulating means therefor.

In general the present invention affords improvements upon and further developments of the panel arrangement disclosed in my prior Patent No. 1,826,865 which illustrates a closure panel movable along a generally vertical path and into a position wherein it is laterally tilted or laterally inclined in relation to adjoining upright members as, for example, a windshield standard and an adjoining panel. Such an arrangement is advantageous in affording vertical openings at the rear and/or front of the panel which may permit a limited degree of air flow or ventilation while affording substantial protection against the entrance of rain or snow while the vehicle is in motion. Furthermore, such an arrangement permits one panel to move into engagement with another by following a path substantially normal to the plane of the overlapped panel.

In accordance with this invention one or more panels may move upwardly along a path wherein the panel is laterally tilted or disposed in an oblique plane in relation to the corresponding portion of the body wall and in most cases in relation to adjoining panels. At the upper end of its path the panel may be moved out of its laterally tilted position, for example, having its edge brought into engagement with the edge of an adjoining panel or with an abutment member such as a cushion upon a door post. In certain embodiments of the invention the movement of the panel into and out of its laterally inclined position may be effected when it is lowered or only partially raised.

Various arrangements may be employed for manipulating the panel. For example, one manually controllable mechanism may be arranged to lift the panel in a generally vertical direction while another mechanism may be operable to cause lateral movement of a portion or all of the panel either in any part of its path or near the upper end of the same. A further development of the invention involves automatic means effective to cause the lateral movement of the panel edge, i. e., the movement of the panel out of its laterally tilted or inclined position, as it approaches the upper end of its path.

To permit these desirable results a variety of instrumentalities may be employed, such as laterally sliding members, rotatable or swinging cam elements or the like, and various means may be afforded to assure the proper retention of the panel edges in mutual engagement when the laterally tilted panel has moved into engagement with an adjoining panel.

The principles of this invention therefore are capable of generic employment to afford a convenient and advantageous manner of moving closure panels so that their edges are in direct juxtaposition to afford a continuous closure wall without necessitating the employment of intervening posts, relatively movable panel sections or the like, while the principles of the invention may also be employed in conjunction with a fixed window frame and/or with an independently movable laterally tiltable element which need not necessarily be vertically movable. Thus a wide variety of different requirements may be answered by the present invention.

The above and further objects and advantageous features of the invention will be apparent to those skilled in the art upon a reading of the subjoined description and claims in conjunction with the accompanying drawings, in which:

Fig. 1 is a broken side elevation of a portion of a vehicle body with parts of the outer face of the body wall removed;

Figs. 2 and 3 are schematic views of the front panel of Fig. 1 and related parts;

Figure 18:
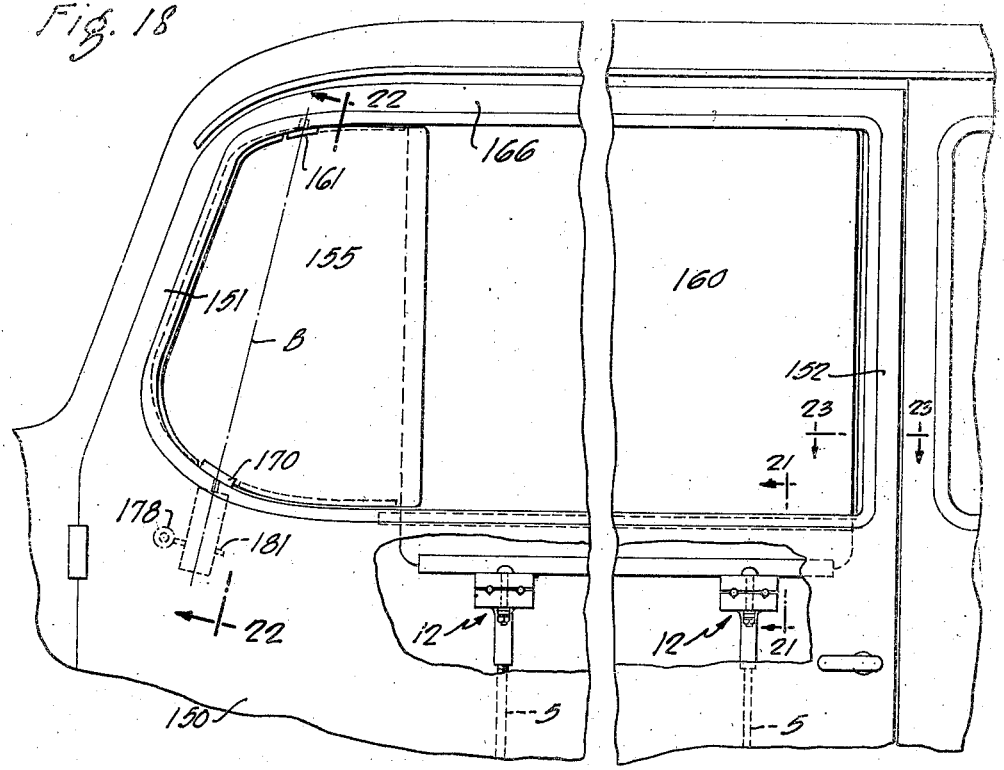
Figure 19:
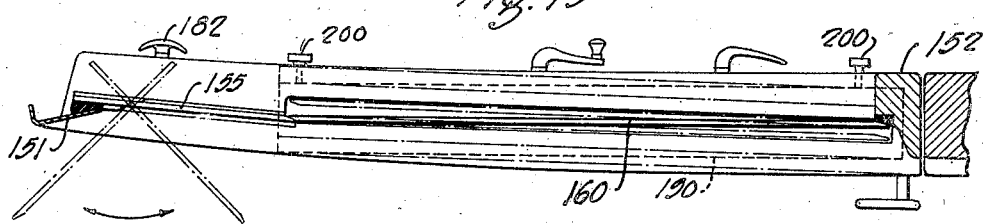
Figure 20:
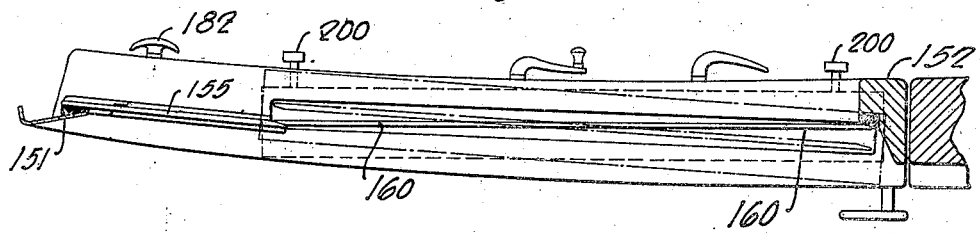

Figs. 4, 5, 6 and 7 are sections indicated by lines 4—4, 5—5, 6—6 and 7—7 respectively of Fig. 1;

Fig. 8 is an isometric view of a typical control cam employed in the arrangement illustrated in Fig. 1;

Fig. 9 is an elevational detail of a panel support;

Fig. 10 is a top view of the same, the panel being shown in section;

Fig. 11 is a section indicated by the line 11—11 of Fig. 1;

Fig. 12 is an isometric view of the upper rear corner of the door illustrated in Fig. 1;

Fig. 12a is a sectional detail showing the pivotal mounting of a cam;

Fig. 13 is a top view, somewhat schematic in character, showing an optional arrangement of a panel assembly;

Fig. 14 is a view, partly in section and partly in elevation, showing the supporting and control means for the rear end of the front panel shown in Fig. 13;

Fig. 15 is an end view of a cam element shown in Fig. 14;

Fig. 16 is a section indicated by line 16—16 of Fig. 13;

Fig. 17 is a top view of the element shown in Fig. 15;

Fig. 18 is a broken side elevation of a portion of a vehicle body in which a further development of my invention is incorporated;

Figs. 19 and 20 are horizontal sectional views, schematic in character, illustrating various positions which may be occupied by the panels shown in Fig. 18;

Figs. 21, 22 and 23 are sections indicated by lines 21—21, 22—22 and 23—23 respectively of Fig. 18;

Fig. 24 is a sectional view of another embodiment of the invention, the section corresponding to that of Fig. 21;

Fig. 25 is a top view of a portion of a body wall showing a further development of the invention;

Figs. 26 and 27 are sections indicated by lines 26—26 and 27—27 of Fig. 25;

Fig. 28 is a broken plan view, with parts broken away and shown in section, illustrating the arrangement shown in Fig. 25;

Fig. 29 is a sectional detail showing an optional panel supporting arrangement; and Fig. 30 is a side elevation of such an arrangement.

For convenience in description and to facilitate an understanding of the principles of this invention, reference may first be had more particularly to Figs. 1, 2 and 3. As shown in these figures, a vehicle body may be provided with a swinging door 1 and an adjoining section 2 to which the rear end of the door is hinged. A closure panel 3 is mounted on the door 1, while the panel 4 is similarly mounted on section 2. The panel 4 may be lifted upwardly along a straight vertical path, suitable worms 5 being provided and driven through a horizontal shaft 6 and gearing 7 to lift each end of this panel and hold it against longitudinal tilting. A movable bracket 8 may be carried upwardly by each of these worms and support a leaf spring 9 capable of distortion laterally of the vehicle wall and effective to press the panel 4 against the panel 3 when both panels are fully raised. The lifting arrangement just described is more fully disclosed in my copending application Serial No. 654,995, filed February 3, 1933 which has issued as United States Patent No. 2,043,652.

The front panel 3 may similarly be provided with worms 5 which are driven by a horizontal shaft 6 carrying a gear 11 driven by a gear 10 that may be operated by a conventional hand crank 13. Supports 12 may have internally threaded portions engaging the worms 5. Mounted on the supports 12 is the channeled frame 14 of the panel 3, the body portion of the latter being formed of glass and having a beveled rear edge overlapping an oppositely beveled edge of the panel 4. The brackets 12 are arranged to permit lateral movement of one or both ends of the panel 3 when the same is at or near its raised position. The detailed structure of these brackets or supports will be more fully described, but for present purposes it is to be understood that these brackets are effective in causing vertical movement of the panel 3 and permitting limited lateral movement thereof.

Referring now to Figs. 2 and 3, it is to be understood that elongated cams 20 may be arranged at opposite sides of the panel 3 and within the upper part of the door 1, these cams being provided with tubular shafts 21 which are capable of rotation so that eccentric end portions of the cams are rotated to cause lateral tilting of the panel. Thus, as shown in Fig. 2, the inner cam 20 is positioned to press the front edge of panel 3 against a portion of the front door post or windshield standard assembly 24, while the outer cam 20 in Fig. 2 is positioned to press the rear edge of panel 3 into engagement with the edge of panel 4.

In the position of the parts illustrated in Fig. 3, the cams have been rotated so that the outer cam 20 is effective in holding the front edge of the panel 3 away from the windshield standard and the inner cam 20 is effective in holding the rear edge of the panel 3 away from the front of panel 4. Thus in this position of the parts the panel 3 is laterally tilted in relation to the panel 4, and air may be admitted and emitted around the edges of the panel.

Figs. 11 and 12 show certain advantages of this arrangement, the panel 3 normally being positioned so that the door 1 may have a rabbeted end portion with an inner inclined wall 26 provided with a slot 27 at its upper end through which the edge of the panel may be moved by manipulation of the cams 20 to move the panel into the position illustrated in Figs. 2 and 11. In this position of the parts, as particularly indicated in Fig. 11, the edge of panel 3 may overhang the bottom of slot 27 and of a corresponding slot 27ª in the rear section 2. Thus this arrangement may conveniently be employed in a convertible body, not only to permit the lateral tilting of the front panel for ventilating purposes, but also to permit the ends of the body wall sections to be provided with continuous wall portions for the major portions of their heights; i. e., the necessity for deep slots is avoided.

Fig. 11 also shows the arrangement of the hinges 30 and 31 which define an inclined hinge axis which intersects the top of the rear section 2 at the point designated A. This axis is arranged so that the upper corners of raised panels, when the panel 3 is in the position illustrated in Fig. 2, may normally remain in contact or close juxtaposition even when the door is swung to its fully open position. Obviously the panel 3 must be moved laterally entirely out of contact with the panel 4 before it has passed downwardly from its fully raised position to any great extent. Thus when the panels are fully raised the arrangement of the hinge axis is effective in protecting the glass edges of the panels against shock due to substantial relative movement, while the panel 3 is entirely out of contact with the panel 4 when the former is moved substantially out of its raised position.

Figs. 4, 5, 6, 7, 8 and 12ª illustrate the cams 20 in greater detail. These cams have tubular shaft portions 21 extending to the ends of the cams and engaging suitable bearing studs on the plates 35, Figs. 11 and 12ª. Secured to each shaft 21, as by welding or brazing, is an irregular core element 36 which tapers in form from one end of the cam to the other. Thus near the front of the cam the cross section of the element 36 is substantially as shown in Fig. 4, while at the rear of the cam the element is shaped substantially as shown in Fig. 5. Intermediate its length each cam element 36 is shaped as shown in Figs. 6 and 7, thus being provided with a portion substantially defining the sector of a circle. In other words, the mid portions of the cams are so shaped that there is little or no lateral movement of the adjoining part of the panel.

Disposed about each tubular shaft 21 and core 36 may be a jacket 37 of yieldable material, such as rubber. Accordingly extremely accurate positioning of the cams is not essential and the surface portions thereof in engagement with the panel 3 may be slightly distorted to aid in holding the panel in position, particularly when the panel is in the position illustrated in Fig. 3. Suitable rubber cushioning elements 40 may extend along the slot in the upper end of door 1 to engage the panel 3 at the limits of its lateral path.

Various means may be provided to manipulate the cams 20. As shown in Figs. 6 and 7, a hand crank 42 may be effective to rotate a worm 43 engageable with a worm gear sector 44 that is secured to the intermediate part of the shaft 21 of the inner cam 20. Extending from this portion of the inner cam there may be a short arm 45 connected to a link 46, the lower end of the latter being articulated to a rocker 47 mounted on a bracket 48 at the bottom of the door 1. The opposite end of rocker 47 is connected to a link 46ª which is pivotally connected to a crank 45 upon the outer cam 20. The cranks 45, links 46, 46ª and rocker 47 are arranged so that the eccentric portions of the cams may be moved in relation to each other in such a manner that wedging or jamming is avoided. Thus when the cams 20 move from the position illustrated in Figs. 2 and 5 to the position illustrated in Fig. 3, the cams rotate at a non-uniform speed in relation to each other; i. e., the eccentric portion of the outer cam 20 moves downwardly away from the position illustrated in Fig. 5 for a substantial distance, while the opposite or inner cam 20 has only moved upwardly for a slight distance. Conversely, when the eccentric portion of the outer cam 20 moves upwardly, the corresponding portion of the inner cam moves a considerably greater distance out of its uppermost position. Thus the eccentric portion of each cam leaves its uppermost position at a rate greater than it leaves its lowermost position. Otherwise when the cams, for example, occupy positions midway between the ends of their paths, there would be serious danger of jamming.

The bracket 12, previously referred to, comprises a horizontal platform 55 connected to or integral with the internally threaded sleeve 54. This platform is provided with a slot 56 engaging a vertical angle 57 upon the outer wall of the door, thus to oppose rotation of the platform with the rotating worm 5. The platform 55 is provided with substantially transverse grooves 58 which may be of V-shape, receiving bars or wires 59 that are welded or otherwise secured to a plate 60 that in turn is secured to the channeled frame 14 of the panel 3. A bolt 61 is fixed in the plate 60 and loosely engages a transverse slot 62 in the platform 55, a rubber washer 63 being disposed between metal washers 64 at the lower end of this bolt. Thus a support is afforded for each end of the panel permitting limited transverse movement of the panel. The bars 59 may have a slight lateral movement (longitudinally of the body) in relation to the grooves 58, and the clearances provided between the slots 62 and bolts 61 permit either end of the panel, rather than following an exactly straight transverse path, to follow a path that is slightly curved. The yieldability of the washer 63 permits a slight tilting of the panel in relation to the supporting platform 55, although limiting such a relative movement.

In order to assure the proper retention of the panel edges in mutual engagement with each other, I may provide a rear bumper or abutment member 70 (Figs. 5 and 11) formed of rubber and adjustably mounted upon a hand screw 71 that is received in a threaded boss upon the inner wall of door 1. When the rear end of panel 3 is moved laterally, the outer cam 20 engages the panel above the frame 14, thus acting as a fulcrum element. Below this cam 20 the adjustable abutment member 70 may press upon the opposite surface of the panel, thus tending to tilt its upper portion into engagement with the rear panel 4. The spring mounting of the rear panel, being of the general type shown in my Patent No. 1,826,865 and including the spring 9, permits the edge of the rear panel to conform to the angular position of the front panel. Thus means is provided assuring the yieldable retention of the panel edges in engagement when the panel 3 is moved to its fully closed position.

At the front of the door the post 24 may be provided with a suitable rubber cushion to engage the outer surface of the panel. If desired, a fixed metal bumper element 22, shown in Fig. 4, may be disposed on the outer wall of the door to aid in holding the front edge of the panel against this rubber element.

It is evident that the panel 4 may be moved up and down to follow a substantially straight vertical path, while the panel 3 may move upwardly from its lower position, occupying the general position shown in Fig. 3 until at or near the upper end of its path. Thereupon the crank 42 may be operated to cause lateral movement of the panel ends so that the rear end of the panel may be brought into engagement with the panel 4 and its front end into engagement with the rubber sealing element upon post 24. The vertical movement of panel 3 may then be continued to its fully raised position, if that position has not already been attained.

Figs. 13 to 17 inclusive illustrate a further development of the invention illustrated in the preceding figures, which permits the entire movement of the front panel through its laterally tilted to its fully closed position by the operation of a single manipulating means. Furthermore, as shown particularly in Fig. 13, the front end of the panel 80 may merely have a slight pivotal movement, and it may slide in a yieldable channel 82 formed of rubber, felt, or the like, and extending upwardly out of the pocket in door 81 in the post 83 at the front of this door. The rear portion of the panel, however, may have a lateral movement so that the panel is laterally tilted. The rear part of the door and the front portion of the adjoining rear section may be shaped as described with reference to Figs. 11 and 12, and the rear panel 84 may move upwardly along a substantially straight vertical path, as described with reference to the panel 4. The front end of panel 80 may be carried upon supporting means 12 of the character described with reference to Fig. 1, while its rear end may be provided with a special form of support. In any case, the front and rear worms for this panel may be of the type already described, being designated by similar reference numerals 5 and being provided with similar operating gearing driven by a hand crank 13.

In this embodiment of the invention, the rear supporting bracket 86 may have an internally threaded portion engaging the worm 5 and also may have a vertical bore engaging the smooth vertically disposed rod 87, the latter being arranged to prevent rotation of the bracket with the worm. An outstanding ear or lug upon bracket 86 supports a stud 89 which affords a pivotal mounting for a block 91. A bolt 92 secures this block to the lower end of an angular leaf spring 94 which extends upwardly and has its upper end pivotally connected, as designated by numeral 96, to the frame 97 of panel 80. When the panel 80 is at the upper end of its path, its rear portion may swing from the dotted line position illustrated in Fig. 16 to the full line position shown in that figure. Thus the panel is moved from the position shown in dot and dash lines in Fig. 13 to the position shown in full lines in that figure.

To effect this movement, the horizontal shaft 95, corresponding to shaft 6 of Fig. 1 which operates the worms 5 of the lifter mechanism, is threaded and receives a nut element 98 which has a horizontal bore slidably engaging a fixed horizontal rod 100 to prevent rotation of nut 98 with the shaft 95. As the hand crank is operated to lift the panel 80, the brackets supporting the ends of the panel move upwardly on the corresponding worms 5 and the nut 98 is advanced toward the rear of the panel, ultimately reaching the position shown in Fig. 14 as the bracket 86 reaches its uppermost position.

The roller 99 carried by nut member 98 engages a bifurcated cam element 103 which is shaped as illustrated in Figs. 15 and 17 and which is connected by the bolt 92 to the swinging block 91. Thus the roller 99, advancing into the cam slot of the element 103, is effective in swinging the lug 91 and the spring 94 about the stud 89, and consequently the rear end of the panel is swung from the position shown in dot and dash lines, shown in Fig. 16, to the full line position. Preferably the inner wall of the door may be provided with a horizontal rabbet having a rubber cushion 110 therein upon which the channel 97 of panel 80 may be received, as shown in Fig. 16. The spring 94 may be continued to afford a boss 112 to which a sheet metal apron 114 is connected by screws 115. This apron tapers in cross section and terminates in a relatively narrow front end portion which is spaced substantially rearwardly from the post 83. The outer wall of the door may be provided with a rubber cushion 117 adapted to engage the outer face of panel 80 when the latter is in its laterally tilted or dotted line position and adapted to engage the skirt of apron 114 when the latter is in its full line position. Thus the apron 114 and cushion 117 afford a substantially weather-tight seal and avoid an awkward appearing space adjoining the outer surface of the panel when the latter is moved to its fully closed position. In front of the apron 114 the cushion 117 may be extended inwardly to provide a thicker cushion portion juxtaposed to the front end of the panel which has only a slight amount of lateral movement.

It is evident that in this embodiment of the invention the hand crank 13 may be operated to rotate shaft 95, thus causing the rotation of worms 5 and vertical movement of the panel 80. If the latter is moved upwardly out of its lower position, its rear end will be spaced from the rear panel 84, as shown in Fig. 13, until the bracket 86 has nearly approached the upper end of its path, whereupon the nut 98 pushes the roller 99 into engagement with the end of the cam fork 103 and initiates the swinging movement of the spring 94. Thereupon the panel 80 starts its transverse movement to the full line position of Figs. 13 and 16, wherein its rear end rests upon rubber cushion 110. In this position of the parts the rear edge of the panel obviously engages panel 84 to afford a weather-tight seal, the spring 94 being effective in yieldably pressing the rear edge of panel 80 against the adjoining panel.

When the hand crank is rotated in the opposite direction, the nut 98 is retracted, thus causing the swinging of the cam element 103 in the opposite direction and the movement of the panel and spring 94 toward the dotted line position. It is obvious that during this part of its path the lower rear corner of the panel is moving out of a slot in the rear part of the door similar to the slot 27 of Fig. 12. As the downward movement of the panel is continued the cam fork 103 slides out of engagement with the roller 99, the latter in the meantime moving forward toward the front of the door.

In order to prevent any accidental movement of the panel 80 toward its full line position of Fig. 16 when its lower corner has been moved only slightly below the lower edge of the slot at the rear of the door, I may provide a fixed guide 120 which normally may have the opposite sides of the element 103 pass down on opposite sides thereof. If one were to push inwardly on the rear of panel 80 under these conditions, the forked portion 103 of the panel assembly would engage the guide 120 to prevent any substantial movement of this sort. Obviously as the panel moves downwardly to a greater extent the inner wall of the rabbeted portion of the door corresponding to the wall 26 of Fig. 12 is effective in preventing such a movement.

Figs. 18 to 23 inclusive illustrate a further development of this invention and particularly show the manner in which a vertically movable and laterally tiltable panel may be associated with a panel which is simply laterally tiltable and, furthermore, show the manner in which panels of this type may be associated with each other to provide a substantially continuous transparent window formed of two laterally tiltable sections or a laterally tiltable and vertically movable section. Furthermore, this embodiment of the invention incorporates another control arrangement for effecting the lateral movement of a vertically movable panel. In Fig. 18 the numeral 150 designates a vehicle door having a front post 151 and a rear post 152. Mounted on the front of the door is a laterally tilting window or panel 155 which swings about an inclined axis B. The rear panel 160 is adapted to follow a generally vertical path and is provided with brackets 12 such as shown in Figs. 1, 5, 9 and 10. Both the front and rear edges of the panel 160 may be transparent, while the rear edge of the panel 155 may be beveled to engage the correspondingly shaped front edge of panel 160.

In accordance with the embodiment of the invention illustrated in Fig. 18, the panel 155 is adapted to be swung about the axis B to the various positions shown, for example, in Fig. 19, thus to permit a slight circulation of air or to act as a scoop to assure the inflow of a substantial quantity of air. The rear panel 160 may be moved into a laterally tilted position wherein its front edge is spaced from the panel 155 and its rear edge spaced from the post 152 to a position wherein its front edge engages panel 155 and its rear edge engages post 152. Furthermore, the panel 160 may also be moved in a straight lateral direction. Thus each end of the panel may be moved along a limited lateral path independent of the path of the other part of the panel. Accordingly great flexibility in the movement of the panels is afforded to suit practically any weather condition or any individual tastes or preferences.

The mounting for the panel 155 is somewhat yieldable so that the rear beveled edge of the panel may be yieldably held against the front edge of panel 160 when the panels are in engagement. The upper frame 161 of panel 155 (Fig. 22) may be provided with an opening receiving a depending stud 162 which projects downwardly from a plate 163 provided with an upwardly extending fin or flange 164 mounted in a rubber block 165 in the upper rail 166 of the door. Thus the mounting for the upper frame of panel 155 permits a limited lateral movement due to the distortability of the rubber 165.

The lower frame 170 of the panel 155 is connected to a shaft 171 extending downwardly through a rubber member in the top of the door and, being connected to a fork 175 that is secured to diametrically opposite sides of a rubber disk 176; disposed midway between the connections of the fork and disk, are bolt connections 180 with a horizontal worm gear 181. A worm shaft 178 driven by a handle 182 operates gear 181. Thus rotation of the handle causes turning of the worm gear, the shaft 171, and the lower panel frame 170 and thus a swinging movement of the panel 155. The element 176 is capable of distortion in its own plane so that the panel may be swung to a position in firm engagement with the edge of panel 160, the disk 176 being angularly distorted to assure this engagement, i. e., the gear 181 being rotated somewhat beyond the position which would be required to cause the panels merely to contact.

Figs. 21 and 23 illustrate somewhat more in detail the arrangement of the means for effecting lateral tilting of the panel 160 or lateral movement of both ends of this panel in the same direction, if desired. It is to be understood that the brackets 12 move upwardly on worms 5 in the manner already described and that they are arranged so that lateral movement of either end of the panel as well as movement along a slightly curved path is permitted. Furthermore, the rubber washers 63 permit a nominal movement of the panel 160, thus permitting it to conform somewhat to the position of the related parts despite body distortion.

At the door rail, a rectangular frame 190 preferably is provided surrounding the panel 160, the latter sliding upwardly through this frame. Frame 190 has opposite longitudinal portions 191 formed of metal and covered with rubber, these portions normally engaging the opposite faces of the panel glass. Each of the longitudinal portions of the frame is slidably mounted in a horizontal groove or channel 193 in the upper part of the door. Near each end of the panel the metal portion 191 upon the inner side of the rectangular frame may be provided with a depending ear 194. A rubber block 195 is mounted on this ear and a plate 196 is secured upon the outer face of the block. A stud 197 is welded or otherwise secured to plate 196 and is threaded into a rotatable boss which is connected to the rotatable handle 200. Thus the handle 200 may be rotated to pull the ear 194 inwardly toward the inside of the body or to move it in the opposite direction. Since the rectangular frame is connected to this ear, the adjoining end of the panel will be moved in a corresponding manner. However, the end of the panel may follow a slightly curved path rather than being constrained to follow a straight path due to the arrangement of the bracket 12 as already described, as well as due to the provision of the rubber block 195 which permits slight tilting of the frame in relation to stud 197. It is evident that an arrangement of this character is provided at both the front and rear of the panel 160 and that either handle 200 may be operated independently, as desired. Furthermore, this arrangement, when employed with a door of the type illustrated in Figs. 18 and 19, permits the lateral movement of the panel in any of its vertical positions.

The rear post 152 may be provided with a rubber cushioning member 205 to engage the rear beveled surface of the panel 160, as shown in Fig. 23, the post being so shaped as to afford an air passage which is outwardly and rearwardly inclined when the panel is in the dot and dash line position, i. e., spaced from the post 152.

When the panels 150 and 155 are manipulated into substantially coplanar juxtaposition, the yieldable disk 176 and the rubber block 165 permit some yieldability in the position of the rear edge of the front panel, while the yieldable washers 63 and the rubber of the rectilinear frame 190 are effective in yieldably maintaining the panel 160 in its approximate position. It is evident that the rubber disk 176 affords a torsional pressure upon the entire edge of panel 155 while the rubber block 165 permits a certain amount of lateral yieldability in the position of its upper portion, the yieldable mountings of the two panels thus being able to cooperate in pressing their edges together and maintaining them in engagement despite slight inaccuracies in workmanship, body strains, door warping, or the like.

Fig. 24 shows an optional arrangement which may be employed rather than the frame arrangement illustrated in Fig. 21 to cause the lateral movement of the panel. For this purpose a cam bar 220, which may be generally arcuate in cross section, may slide in a groove 221 which is similarly arcuate in cross section and is disposed in the top of the door. The cam bar 220 may have a metal core and a rubber jacket to permit limited distortion and variation in positioning of the parts and may have each of its ends connected to a swinging arm 223 which carries a sector-like end portion 224 engaging a worm 225 operable by a handle 226. Obviously such an arrangement may be employed near each end of the door and the panels may be mounted on supports 12 of the general character already described.

At the outer wall of the door an arcuate member 220ᵃ may be provided, of the same general shape as the member 220, and compression springs 227 may yieldably press the member 220ᵃ against the outer face of the glass. Thus an arrangement is afforded wherein there is no necessity for positive connecting means between the inner and outer cam elements which effect the lateral movement of the panel, while the same independence of movement of the panel ends may be permitted as is afforded by the arrangement illustrated in Figs. 18 to 23 inclusive.

Fig. 25 illustrates a further variation of the invention and particularly an arrangement incorporating certain features of the invention illustrated in Fig. 1 with features illustrated in Fig. 13. In this embodiment of the invention cams 320 may be arranged in the general manner of the cams 20 of Fig. 1, but these cams are shaped so that the panel 323 merely has its rear end laterally movable, while its front end may be slidably mounted in a cushioning channel 82 in a door post 83 similar to that shown in Fig. 13. Thus, as shown in Fig. 26, the front portions of cams 320 may be circular, while the rear portions thereof may have a cross section similar to that shown in Fig. 5. The panel 323 may be mounted on any suitable supporting and lifting means, such as that disclosed in Fig. 1.

In this embodiment of the invention the cams 320 may be connected to each other in the same manner as shown in Fig. 7 and a handle 342, corresponding to the handle 42, may be employed to cause the lateral movement of the panel edge. Thus under normal conditions the panel may be lifted and lowered by manipulation of the hand crank 313, while lateral movement of the panel at the upper end of its path may be effected by the handle 342.

Fig. 28 illustrates an optional development of the invention wherein the panel 403 may be mounted on suitable supporting and lifting means such as have been described, and the door 401 may be shaped similarly to the door 1. In this embodiment of the invention separate cams are provided at the front and rear of the panel to permit separate independent lateral movement of these portions of the panel. Thus the cam at the rear of the panel may have a shape similar to that shown in Figs. 5 and 27, while the cam at the front of the panel may have a shape similar to that shown in Fig. 8. The front cam is designated by numeral 422 and the rear cam by numeral 423, and each of these cams is provided with a tubular portion 424 rotatably mounted upon a shaft 425 extending between the cams, so that the axial portions of the cams are maintained in concentric relation.

A continuous rubber jacket 427 may cover the cams 422 and 423 and the shaft elements 424 and 425, thus giving the appearance of a continuous cam. As one of the cams 422 or 423 is rotated and the other remains fixed, the rubber between the cams is twisted and accommodates itself to the shape of the glass. In order to afford a weather-tight seal adjoining the outer face of the glass 403, a sliding rail shaped like a side of the frame 190 and designated 416 may be afforded, suitable compressible springs 417 engaging this rail at intervals and pressing it against the face of the cam.

Figs. 29 and 30 show an optional arrangement of spring means capable of employment with the supporting bracket 12 in place of the rubber abutment member 70 of Figs. 11 and 12. For this purpose the plate 60 and the frame 14 may have the upper end of a leaf spring 450 secured thereto, the lower end of the spring being engageable with an abutment piece 452 on the inner wall of the door. Thus when the panel is moved laterally, the spring is distorted due to its engagement with member 452 so that it tends to press the upper part of the panel laterally into engagement with the adjoining panel.

While for convenience of illustration I have illustrated the cam means, for example, of Figs. 1 to 7 inclusive, as employed with straight or planar panels, it is evident that the cams may be readily shaped, if desired, for engagement with panels having a longitudinal curvature.

It is evident that the principles of this invention afford a wide variety of advantages. Not only may this invention permit the employment of a laterally tilted panel to permit ventilation with weather protection and to permit the movement of air as desired, but also to permit the movement of panels into direct juxtaposition to afford a closure wall without necessitating deep slots in the ends of adjoining body wall sections.

Obviously, as shown, a wide variety of means may be employed to effect the lateral and vertical movement of a panel and its positioning in various ways to contact adjoining upright members or panels or to afford vertical spaces therebetween, as desired, under different operating conditions. Certain features of this invention may be employed when the panel does not leave its laterally tilted position, such an adaptation of this invention being more fully disclosed and described in my copending application Serial No. 654,995, filed February 3, 1933, which has issued as United States Patent No. 2,043,652.

The principles of this invention may be employed either in a closed car of the conventional type or in a convertible vehicle, and the panels themselves may be associated in different ways so that a vertically movable and laterally tilted panel may be employed with either a panel which is merely vertically movable or a panel which is laterally tiltable.

I claim:

1. A vehicle body comprising a body wall, a panel movable out of a substantially concealed position within the wall to a raised position thereon, said panel when in its concealed position being tilted laterally in relation to the general plane of the portion of the vehicle wall in which it is concealed and lifting and guiding means for said panel causing it to maintain its generally laterally tilted position during the lower major portion of its path toward its fully raised position.

2. A vehicle body comprising a body wall, a panel movable out of a substantially concealed position within the wall to a raised position thereon, said panel when in its concealed position being tilted laterally in relation to the general plane of the portion of the vehicle wall in which it is concealed, lifting and guiding means for said panel causing it to maintain its generally laterally tilted position during the major portion of its path out of its concealed position towards its fully raised position, means effective to move the panel out of its laterally tilted position when it approaches the upper end of its path, and a member against which the edge of the panel may be moved as the panel moves out of its laterally tilted position.

3. A vehicle body comprising a body wall including a pair of body wall sections, panels carried by each of said sections, one of said panels being located in front of the other and being movable from a substantially concealed to a fully raised position, the front panel occupying a laterally tilted position wherein its edge is spaced from the path of the adjoining edge of the rear panel during a substantial portion of its path, and means to move said front panel out of the laterally tilted position so that the panel edges may be in juxtaposition when both panels are fully raised.

4. A vehicle body comprising a body wall including a pair of body wall sections, panels carried by each of said sections, one of said panels being located in front of the other and being movable from a substantially concealed to a fully raised position, the front panel occupying a laterally tilted position wherein its edge is spaced from the adjoining edge of the rear panel during a substantial portion of its path, and means to move said front panel out of the laterally tilted position so that the panel edges may be in juxtaposition when both panels are fully raised, the adjoining end portions of the body wall sections having upper parts broken away thus to permit the panels to be juxtaposed.

5. A vehicle body comprising a panel, a support for the same and means to impart movement to said support, said support comprising a member operatively connected to said means, a connecting element and a part fixed to the panel, and a compressible member disposed between the connecting element and one of said members to permit a limited degree of tilting movement of the panel in relation to said mechanism.

6. A vehicle body comprising a body wall having a pocket therein, a panel movable upwardly out of said pocket, a substantially vertical member to guide said panel in its upward movement, a swinging member movable about a substantially horizontal axis and operatively connected with said vertical member, said swinging member being pivotally connected to the panel, and mechanism to cause the upward movement of the panel and the movement of the swinging member about said axis to effect the lateral movement of the adjoining portion of the panel.

7. A vehicle body having a body wall, a panel carried by the body wall and movable into a plurality of positions, namely, (1) a position wherein it is laterally tilted in relation to the adjoining portion of the body wall, (2) a position wherein it extends in substantially the same general direction as the body wall, and (3) another position wherein it is laterally spaced from but parallel to said second-named position and operating means connected to the lower part of the panel to effect the movement of the same to each of the three positions.

8. A vehicle body comprising a body wall having a pocket therein, a panel movable upwardly out of the pocket to a raised position, means to effect the vertical movement of the panel, and independent means to effect the lateral tilting of the panel so that it may be laterally tilted with a forward and inward inclination or may be laterally tilted with a forward and outward inclination.

9. A vehicle body comprising a body wall having a pocket therein, a panel movable upwardly out of the pocket to a raised position, a screw-threaded rod, a support on the rod, and means for rotating the rod and preventing rotation of the support, said support having a connection with the panel permitting limited lateral movement of the latter.

10. A vehicle body comprising a body wall, a panel supported by the wall and arranged so that it may move into and out of a laterally tilted position, a cam extending substantially longitudinally of the vehicle wall and having an eccentric portion effective to cause the lateral movement of one end of the panel and to exert pressure upon the lower part of that end of the panel, and a fixed bumper element disposed above the eccentric portion of the cam and cooperating therewith in yieldably pressing the panel into engagement with an adjoining member.

11. A vehicle body comprising a body wall having a pocket therein, a panel movable upwardly from a substantially concealed position within the pocket, manually controllable mechanism to effect the upward movement of the panel, and a pair of manually actuable controllers operatively connected to opposite ends of the panels arranged so that they may be independently actuated to effect the movement of either end of the panel independently of the position of the other end thereof and independently of its vertical positioning.

12. A vehicle body comprising a body wall, a panel mounted on the body wall and arranged to move vertically into a pocket in the wall, a pair of manual controllers, and means connecting the controllers to the opposite ends of the panels so that either controller may be independently actuated to effect lateral movement of the corresponding end of the panel irrespective of the movement of the other end thereof.

RAYMOND L. CARR.